(12) United States Patent
Wong

(10) Patent No.: US 7,349,025 B2
(45) Date of Patent: Mar. 25, 2008

(54) SURVEILLANCE APPARATUS

(76) Inventor: Thomas K. Wong, 795 Panorama Dr., San Francisco, CA (US) 94131

( * ) Notice: Subject to any disclaimer, the term of this patent is extended or adjusted under 35 U.S.C. 154(b) by 860 days.

(21) Appl. No.: 10/764,724

(22) Filed: Jan. 26, 2004

(65) Prior Publication Data

US 2005/0162544 A1   Jul. 28, 2005

(51) Int. Cl.
*H04N 5/225* (2006.01)
(52) U.S. Cl. ........................................ 348/373
(58) Field of Classification Search ............... 348/373, 348/158, 143; 396/427, 428; 352/243, 132
See application file for complete search history.

(56) References Cited

U.S. PATENT DOCUMENTS

| | | | |
|---|---|---|---|
| 4,815,757 A * | 3/1989 | Hamilton | 280/764.1 |
| 6,056,450 A * | 5/2000 | Walling | 396/428 |
| 6,585,428 B1 * | 7/2003 | Wesselink et al. | 396/427 |
| 2003/0025791 A1 * | 2/2003 | Kaylor et al. | 348/143 |

* cited by examiner

*Primary Examiner*—David Ometz
*Assistant Examiner*—Tuan Le
(74) *Attorney, Agent, or Firm*—Thomas R. Lampe

(57) ABSTRACT

A mobile surveillance apparatus including a trailer and mast pivotally connected to the trailer and movable between a vertical position and horizontal position. A plurality of surveillance cameras are mounted on the mast along with a light, the latter being positioned within a space behind the cameras.

5 Claims, 4 Drawing Sheets

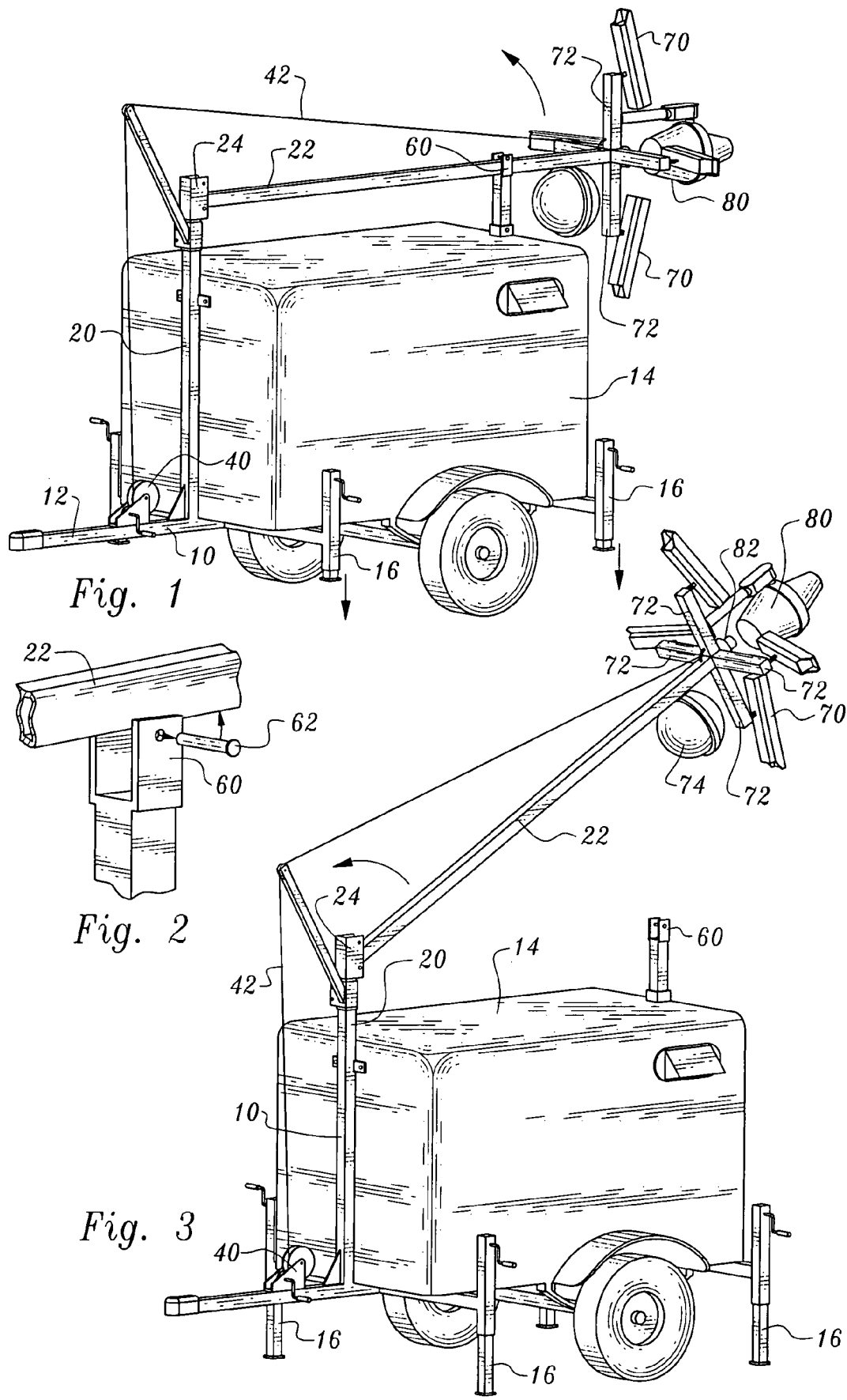

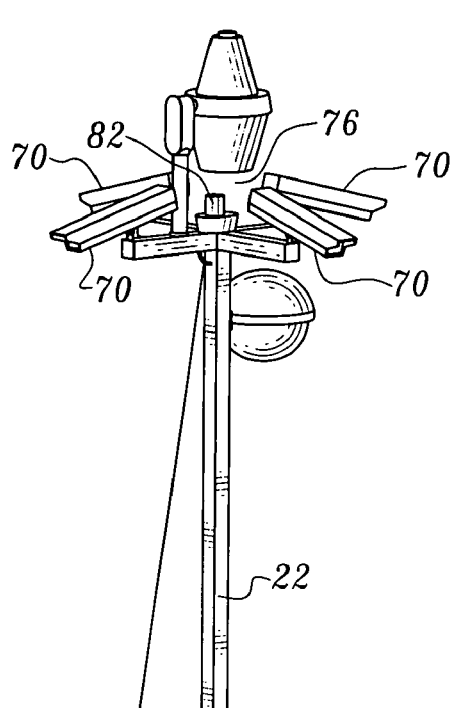
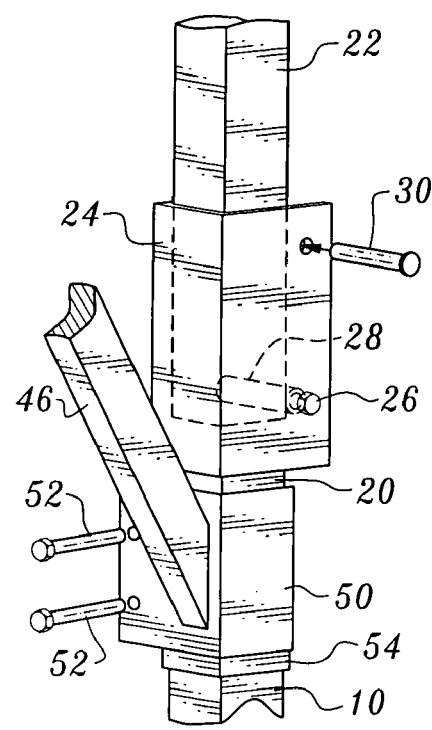
Fig. 4
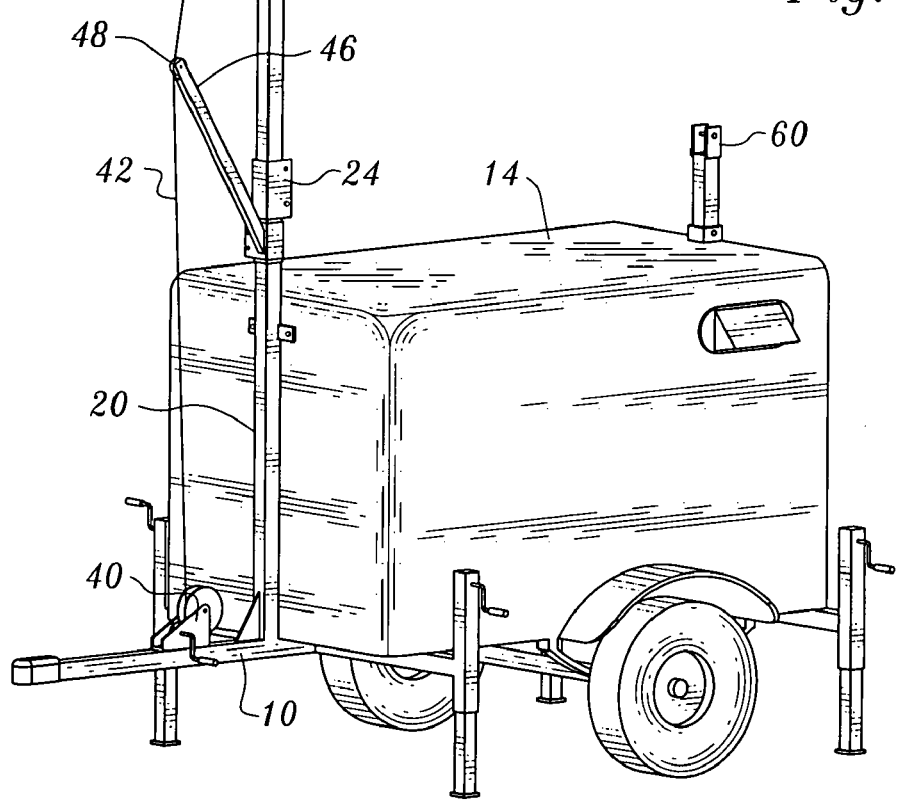
Fig. 5

SURVEILLANCE APPARATUS

TECHNICAL FIELD

This invention relates to surveillance apparatus and more particularly to portable apparatus including surveillance cameras and lights which may readily be moved to and from a selected site.

BACKGROUND OF THE INVENTION

It is known to incorporate video cameras and other types of cameras and lights in surveillance systems employed on or in connection with trailers which can be moved from site to site. Such portable facilities can be in communication with one or more interactive command centers allowing real time surveillance of a site, for example a construction site.

One prior art arrangement of this type is a mobile unit including a trailer and cameras and lights mounted on the trailer made available by eCam Secure having a website at www.ecamsecure.com. In that security system a plurality of surveillance video cameras are mounted on a telescopic mast affixed to the top of the trailer. The arrangement is inefficient from the standpoint of set up and breakdown of the mast at the site, and also insofar as efficiency of operation is concerned. The referenced prior art apparatus employs four lamps to illuminate the site, one light being mounted on each side of the trailer. Such an arrangement not only results in a high glare to the immediate surroundings, but also requires a tall trailer and high power consumption.

DISCLOSURE OF INVENTION

The surveillance apparatus of the present invention includes a trailer having a trailer frame and a trailer body. The combination also includes a mast having a mast distal end.

A mast connector connects the mast to the trailer, the mast being selectively movable relative to the trailer between a first position wherein the mast projects upwardly from the trailer and a second position wherein the mast extends along the trailer. The mast distal end is higher when the mast is in the first position than when the mast is in the second position.

At least one surveillance camera and at least one light are attached to the mast at or adjacent to the mast distal end and spaced from the mast connector.

The apparatus also includes mast mover structure operatively associated with the mast for selectively moving the mast between the first and second positions. The at least one surveillance camera and at least one light are at a higher elevation when the mast is in the first position than when the mast is in the second position. The mast connector is a pivot connector, the mast being pivotally connected to the trailer by the pivot connector.

Other features, advantages and objects of the present invention will become apparent with reference to the following description and accompanying drawings.

BRIEF DESCRIPTION OF DRAWINGS

FIG. 1 is a perspective view of apparatus constructed in accordance with the teachings of the present invention with the mast thereof in generally horizontal orientation and extending along the trailer of the apparatus above the trailer;

FIG. 2 is an enlarged, perspective view illustrating a segment of the mast and a saddle and lock employed to maintain the mast in a non-operative orientation;

FIG. 3 is a view similar to FIG. 1, but illustrating the mast being raised between operative and inoperative positions;

FIG. 4 is an enlarged, perspective view showing a lower portion of the mast in association with other components of the apparatus, including a bracket and lock member operatively associated therewith to retain the mast in its operative or vertical position;

FIG. 5 is a view similar to FIGS. 1 and 3, but illustrating the mast in its operative position, projecting upwardly from the trailer;

BEST MODE FOR CARRYING OUT THE INVENTION

Figure 6:
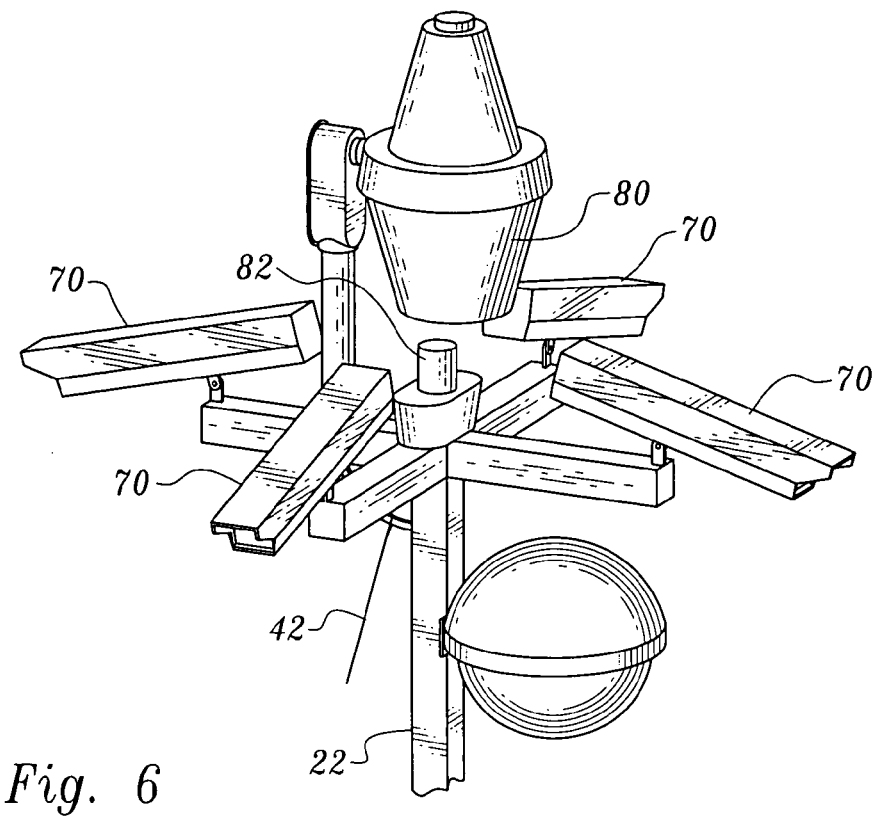
FIG. 6 is an enlarged, perspective view illustrating an upper distal portion of the mast and surveillance cameras and lights supported by the mast.
Figure 7:
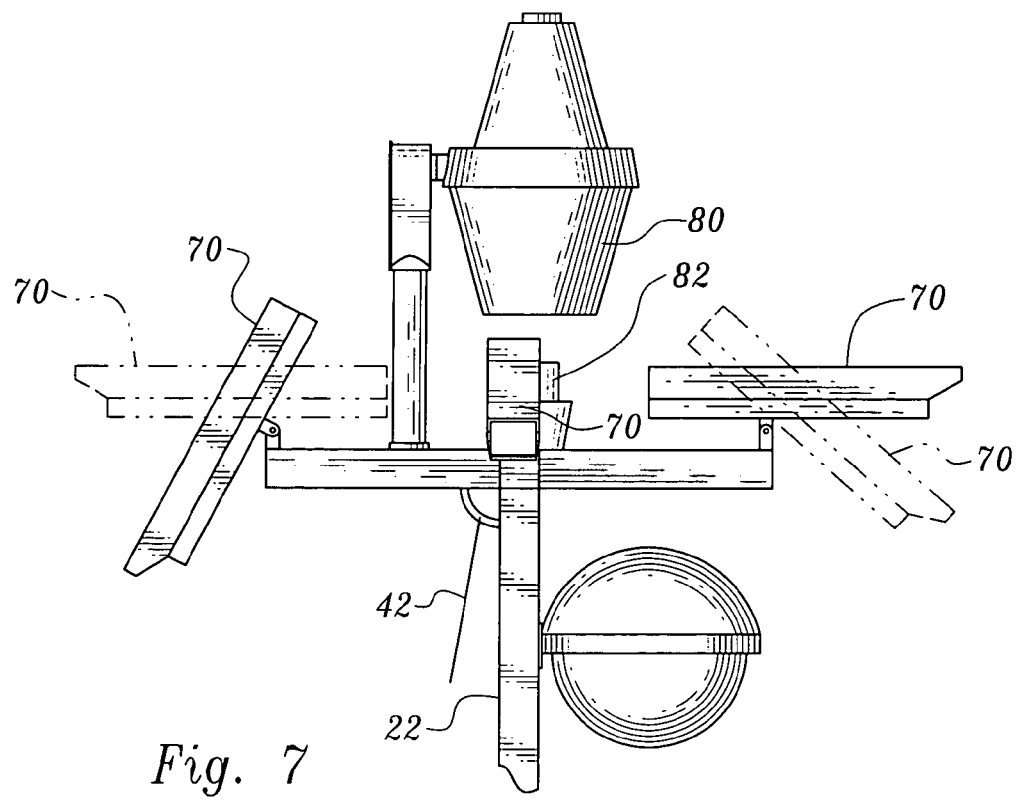
FIG. 7 is a side, elevational view of components shown in FIG. 6 and illustrating two of the surveillance cameras in alternate positions.

Referring now to the drawings, apparatus constructed in accordance with the teachings of the present invention includes a wheeled trailer having a trailer frame 10 including a tow bar 12 and a trailer body or housing 14. Housing 14 accommodates equipment including that utilized to establish communication with a remote control center. Jacks 16 are attached to the trailer frame and utilized to stabilize the trailer on site. FIG. 1 shows the jacks 16 in a retracted condition and FIG. 3 shows the jacks in an extended position for engagement with the ground or other surface.

Trailer frame 10 includes an upstanding frame member 20 extending upwardly along the front of the housing. A mast connector connects a mast 22 to the trailer. The mast 22 is selectively movable relative to the trailer between a first position (shown in FIGS. 4-8) wherein the mast projects vertically upwardly from the trailer and a second position (shown in FIG. 1) wherein the mast is substantially horizontal and extends along the trailer.

Pivotal connection between the mast 22 and the trailer is accomplished by a pivot connector. More particularly, the upper end of upstanding frame member 20 comprises a three sided bracket 24 defining a bracket interior receiving the mast when the mast is in the first or vertical position. Pivotal connection between the mast and the bracket 24 is by means of a pivot pin or shaft 26 which when installed, as shown in FIG. 4, extends through opposed sides of the bracket and through a tubular pivot member 28 welded or otherwise secured to a side of the mast at the lower end thereof. A lock pin 30 is inserted in holes of the opposed sides of the bracket 24 to abut against and retain the mast in its vertical orientation.

Figure 8:
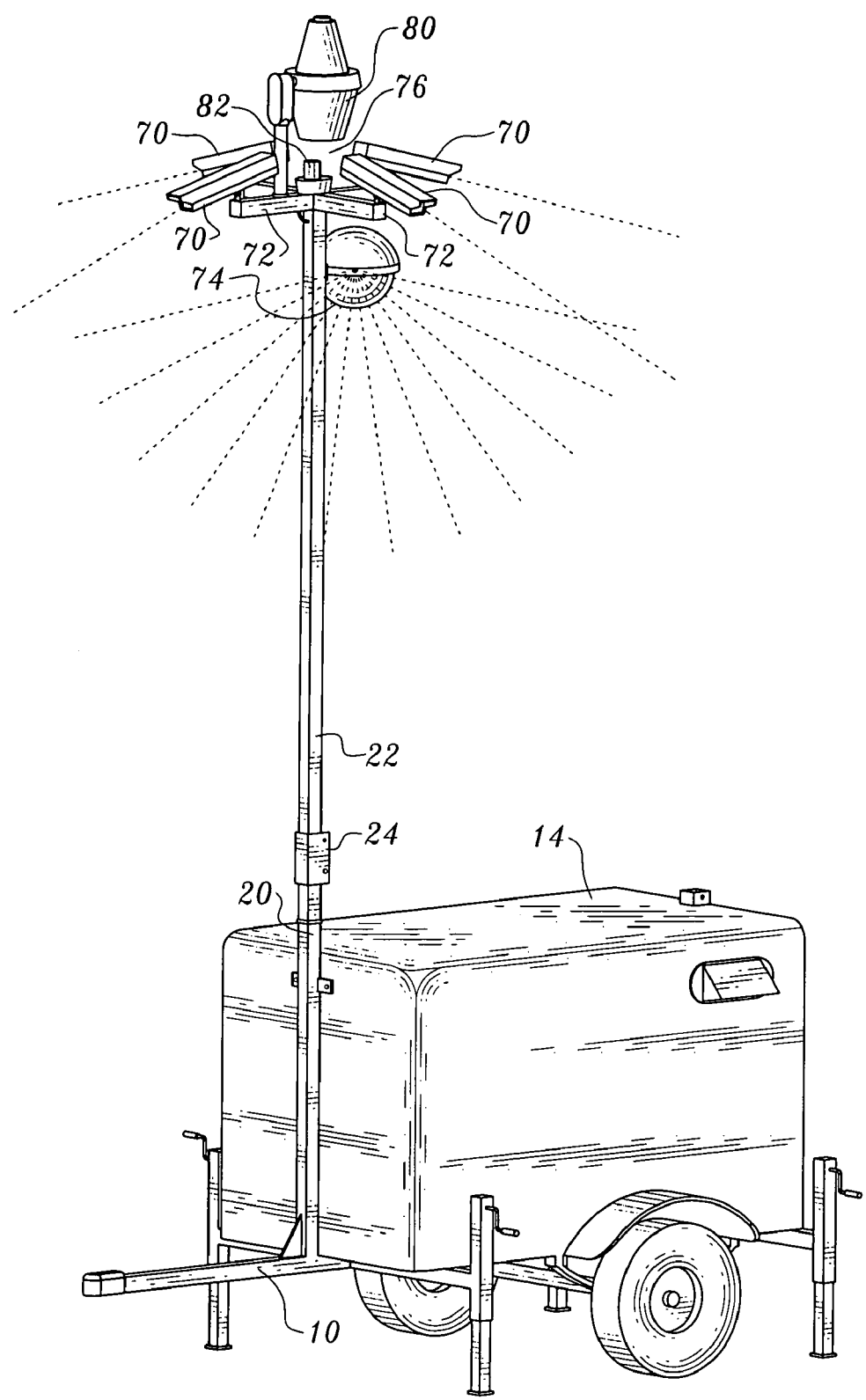
FIG. 8 is a view similar to FIG. 7, but illustrating in diagrammatic fashion operation of surveillance cameras of the apparatus, the saddle and other set-up attachments having been removed from the trailer.

A winch 40 and line 42 extending therefrom are utilized to hoist the mast from its horizontal to vertical orientation as well as to provide support for the mast and the equipment supported thereby when the mast is lowered to its horizontal orientation. The winch 40 and line may, if desired, be releasably connected to the mast and trailer so that they can be removed when the apparatus is in operational condition, as shown in FIG. 8, making it difficult for one to lower the mast.

To facilitate raising or lowering of the mast by the winch and line, when installed, a line support in the nature of a laterally projecting support arm 46 having a line engaging guide roller 48 at the distal end thereof is attached to frame member 20 below bracket 24 by an attachment bracket 50 and support pins or bolts 52 extending between opposed sides of the three sided attachment bracket 50. Downward movement of the attachment bracket 50 relative to the frame member 20 is prevented by an abutment member 54 comprising a portion of the frame member 20. In FIG. 8, the support arm 46 and attachment bracket 50 have been removed from the frame member 20 to further make it more difficult for an unauthorized person to lower the mast from its operational or vertical position.

Extending upwardly from the trailer body 14 at a location spaced from bracket 24 is a mast support including a saddle 60 defining a space receiving the mast when it is in its lowered or horizontal condition. FIG. 1 shows the mast in the space of the saddle and FIG. 2 shows the mast just prior to positioning thereof in the saddle space. A lock pin 62 extending between aligned holes of the saddle 60 is employed to releasably secure the mast in the saddle space. The saddle is preferably selectively removable from the top of the trailer as shown in FIG. 8.

Located at the distal end of the mast 22 are a plurality of video surveillance cameras, including cameras 70 located on camera supports or arms 72 projecting from four sides of the mast and one or more cameras (not shown) in a conventional domed camera housing 74. The orientation of and operation of the cameras can be controlled from the remote control area with which the apparatus is associated.

Cameras 70 form a camera cluster defining a central cluster space 76. A light 80 is disposed within the central cluster space to provide illumination of the site. The light 80 is preferably in the form of a street light providing continuous non-strobe light, the light being evenly distributed due to the centralized location thereof relative to the mast. The location of light 80 behind the cameras 70 of the camera cluster creates a situation or environment wherein light emitted therefrom does not cause glare at the camera lenses or otherwise interfere with the operation thereof. Located below lamp or light 80 is a strobe lamp 82 which can be utilized as a deterrent by alerting a potential intruder of the existence of the surveillance apparatus at a particular site. Again, central placement of strobe light 82 within the cluster space is important since it ensures that the strobe light emitted therefrom will not interfere with performance of cameras 70.

The invention claimed is:

1. Surveillance apparatus comprising, in combination:
   a trailer including a trailer frame and an elongated trailer body having opposed trailer ends, said trailer frame including an upstanding frame member extending alongside and adjacent to one of said trailer ends, said frame member having a frame member distal end elevated relative to said trailer body;
   a mast having a mast distal end;
   a pivot connector pivotally connecting said mast to said frame member distal end, said mast being selectively movable relative to said trailer between a first position wherein said mast projects upwardly from said trailer and a second position wherein said mast extends substantially horizontally from said frame member distal end along and over said elongated trailer body between said trailer ends, said mast distal end being higher when the mast is in said first position than when the mast is in said second position;
   lock structure for selectively releasably locking said mast in either said first position or said second position, said frame member distal end comprising a bracket defining a bracket interior receiving said mast when said mast is in said first position and an opening at a side thereof allowing for the passage of said mast into and out of said bracket interior, and said lock structure including a lock member operative associated with said bracket to selectively lock said mast in said bracket interior in said first position;
   a plurality of surveillance cameras and at least one light attached to said mast at or adjacent to said mast distal end and spaced from said mast connector, said surveillance cameras being spaced from one another and forming a cluster of surveillance cameras defining a central cluster space, said at least one light disposed in said central cluster space at a predetermined location in said central cluster space behind the surveillance cameras wherein said at least one light will not adversely affect operation of said surveillance cameras;
   mast mover structure including a winch releasably connected to said trailer and selectively completely removable therefrom and a line extending between said winch and said mast and connected to the mast at a location spaced from said pivot connector operatively associated with said mast for selectively moving said mast between said first and second positions, said surveillance cameras and said at least one light being at a higher elevation when the mast is in said first position than when the mast is in said second position; and
   a line support arm releasably connected to said upstanding frame member and selectively completely removable therefrom, said line support arm laterally upwardly projecting from said upstanding frame member away from said trailer, said line support arm including a rotatable guide roller engaging, supporting and stabilizing said line.

2. The surveillance apparatus according to claim 1 additionally comprising a saddle extending upwardly from said trailer body at a location spaced from said pivot connector defining a space receiving said mast when said mast is in said second position, said lock structure including a lock member operatively associated with said saddle to selectively lock said mast in said space in said second position.

3. The surveillance apparatus according to claim 1 wherein said at least one light comprises a strobe light.

4. The surveillance apparatus according to claim 1 wherein said at least one light comprises an electric light for providing continuous non-strobe light.

5. The surveillance apparatus according to claim 1 including an abutment member on said upstanding frame member for supporting said line support.

* * * * *